United States Patent [19]
Hughes

[11] Patent Number: 5,281,147
[45] Date of Patent: Jan. 25, 1994

[54] MODIFIABLE HARNESS ADAPTOR AND METHOD

[76] Inventor: Michael T. Hughes, 504 2 St., P.O. Box 1379, Berthoud, Colo. 80513

[21] Appl. No.: 41,937

[22] Filed: Apr. 2, 1993

[51] Int. Cl.⁵ .......................................... H01R 13/514
[52] U.S. Cl. ...................................... 439/35; 439/171; 439/503
[58] Field of Search .................. 439/35, 503, 171, 173, 439/686, 695, 701, 540, 518

[56] References Cited

U.S. PATENT DOCUMENTS

| | | | |
|---|---|---|---|
| 2,557,818 | 6/1951 | Eddy | 439/518 |
| 3,440,596 | 4/1969 | Frompovicz | 439/695 |
| 3,873,172 | 3/1975 | Paullus | 439/686 |
| 4,781,393 | 11/1988 | Jeter | 439/35 |

FOREIGN PATENT DOCUMENTS 1336595  11/1973  United Kingdom ............... 439/518

Primary Examiner—Gary F. Paumen

[57] ABSTRACT

A modifiable harness adaptor (10) interfaces a conventional four-way-flat harness connector with any conventional four-way-round harness connector having any orientation of male pin terminals (38a-38d). The modifiable harness adaptor (10) has a first adaptor connector (14) for connecting to a correlative four-way-flat harness connector. Interconnect wires (16a-16d) connect the four-way-flat adaptor connector (14) with a modifiable four-way-round adaptor connector (12). The modifiable four-way-round adaptor connector (12) has four sectorial terminal sections (26a-26d), each comprising a corresponding female pin terminal (28a-28d). The four sectorial terminal sections (26a-26d) are held together to form a cylindrical configuration via a ring-like retainer (42) which is slidably engaged about the longitudinal portion of the sectorial terminal sections (26a-26d).

9 Claims, 1 Drawing Sheet

MODIFIABLE HARNESS ADAPTOR AND METHOD

FIELD OF THE INVENTION

The present invention generally relates to electrical systems on vehicles, and more particularly, to a modifiable harness adaptor and method for interfacing incompatible vehicle harness connectors disposed on separate vehicles.

BACKGROUND OF THE INVENTION

In recent years, the rising popularity of outdoor recreational activities, such as boating and camping, has lead to an increase in the use of trailers, campers, and other towed vehicles. Moreover, many state and federal laws require that towed vehicles, such as trailers, have complete on-board electrical systems for providing, for instance, brake lights, turn signals, and other electrical functionality. These complete on-board electrical systems are usually controlled by the electrical system of the towing vehicle in a master-servant relationship. For example, a driver of the towing vehicle can operate the lights of the towed vehicle by merely controlling the lighting system of the towing vehicle.

Generally, a hard-wired electrical connection is implemented to interface the electrical systems of the vehicles. Hard-wired electrical connections are typically implemented via respective wiring harnesses disposed on the vehicles. Each of the wiring harnesses have harness connectors with female and/or male terminals in a pin and/or blade configuration in order to establish an electrical interconnection between the wiring harnesses. The towed vehicle usually comprises an array of male pin terminals for insertion into an array of female pin terminals associated with the wiring harness of the towing vehicle.

Early wiring harnesses comprised relatively simple harness connectors having four terminals arranged in a linear manner and in a flat configuration. Consequently, these four-terminal harness connectors are commonly known as "four-way-flat" harness connectors. Further, these four-terminal harness connectors were usually sufficient for handling low current requirements of simple electrical systems providing for signal lights, for example, brake lights, parking lights, a left turn signal light, and a right turn signal light.

However, trailers, campers, and other towed vehicles are rapidly evolving and are becoming more sophisticated and larger in size. The newer towed vehicles are equipped with a multitude of more complex accessories, such as electric braking systems, separate air conditioners, stove, and refrigerators. These accessories require higher electrical currents and power, which necessitate heavier and a greater number of interconnections. Today, harness connectors having six or seven wires are becoming increasingly more common on towing vehicles. As a result, the terminals in harness connectors are being arranged in a circular configuration resulting in a round connector end, instead of in a flat configuration, in order to conserve space. The foregoing harness connectors are known in the art as a "six-way-round" harness connector and "seven-way-round" harness connector. Moreover, these harness connectors are being configured with pin and/or blade as well as male and/or female terminals.

However, the implementation of more complex harness connectors having a greater number of terminals is problematic. Over eighty five percent (85%) of conventional trailers in use today still use a four-way-flat harness connector. This includes the majority of commercial rental trailers, as well as all other trailers and towed vehicles that include only an operating lighting system and none of the aforementioned accessories. Consequently, in order to interface these conventional trailers with the electrical system of a newer towing vehicle, the more complex harness connector of the towing vehicle having a multiplicity of terminals must be replaced, modified, or bypassed in some manner. Furthermore, replacing the more complex harness connector with a simple four-way flat harness connector is undesirable because the procedure is expensive and permanently prevents future use of the more complex harness connector with a more sophisticated trailer having a cooperating complex harness connector.

In a conventional modification technique, a pinch-type clamp connector is squeezed directly over the wires of the electrical system associated with the towing vehicle. The clamp connector is intended to cut through the insulation of the wires to establish an electrical connection. Over time, however, the clamp connectors can cut through or cause the wires to break, thereby damaging the electrical system and requiring repair.

In a conventional bypass technique, the light covers are first removed from the tail lights of the towing vehicle. Then, electrical connections are made via the light bulb sockets. Needless to say, this juryrigging arrangement is aesthetically unsightly. Further, this arrangement often destroys the water seal around the light covers, which can undesirably lead to damage to the sockets and electrical system. Finally, as the vehicles move through a turn, the wires tend to pull against the lens covers, thereby damaging the lens covers.

Accordingly, a heretofore unaddressed need exists in the industry for a vehicle harness adaptor and method for interfacing various types of complex harness connectors provided by newer vehicles with the simple four-way flat harness connectors found on older vehicles without requiring total permanent replacement of the harness connector on the towing vehicle and without requiring a juryrigged connection to the harness connector or associated electrical system.

SUMMARY OF THE INVENTION

Briefly described, the present invention is a novel modifiable harness adaptor and method for interfacing a first harness connector of a first vehicle to an incompatible second harness connector of a second vehicle. In structure, the modifiable harness adaptor has a first adaptor connector for connecting to the first harness connector. Further, the adaptor has a second adaptor connector for connecting to the second harness connector. The second adaptor connector has terminal sections, each of which has at least one second adaptor terminal. The terminal sections are configurable, or modifiable, to thereby selectively orient the second adaptor terminals to match the orientation of the second harness connector. In the preferred embodiment, the terminal sections are held together via a removable retainer and are movable upon removal of the retainer. Finally, a plurality of movable interconnect wires connect first adaptor terminals of the first adaptor connector with the second adaptor terminals of the second adaptor connector.

Thus, an object of the present invention is to overcome the problems and inadequacies of the prior art as noted above in the background section of this document.

Another object of the present invention is to provide a harness adaptor and method for interfacing different types of harness connectors.

Another object of the present invention is to provide a harness adaptor and method for interfacing various types of complex harness connectors with the simple four-way-flat harness connector.

Another object of the present invention is to provide a method for fabricating a harness adaptor having an adaptor connector with a configurable, or modifiable, terminal orientation.

Another object of the present invention is to provide a modifiable harness adaptor having an adaptor connector which can be easily and quickly adjusted to match and interface with a particular harness connector.

Another object of the present invention is to provide a modifiable harness adaptor which is simple in design, durable in structure, inexpensive to manufacture, and reliable as well as efficient in operation.

Other objects, features, and advantages of the present invention will become apparent from the following detailed description when taken into conjunction with the accompanying drawings in which like characters of reference designate corresponding parts throughout the several views.

BRIEF DESCRIPTION OF THE DRAWINGS

The present invention, as defined in the claims, can be better understood with reference to the following drawings. The drawings are not necessarily to scale, emphasis instead being placed upon clearly illustrating principals of the present invention.

DETAILED DESCRIPTION OF THE PREFERRED EMBODIMENT

Figure 1:
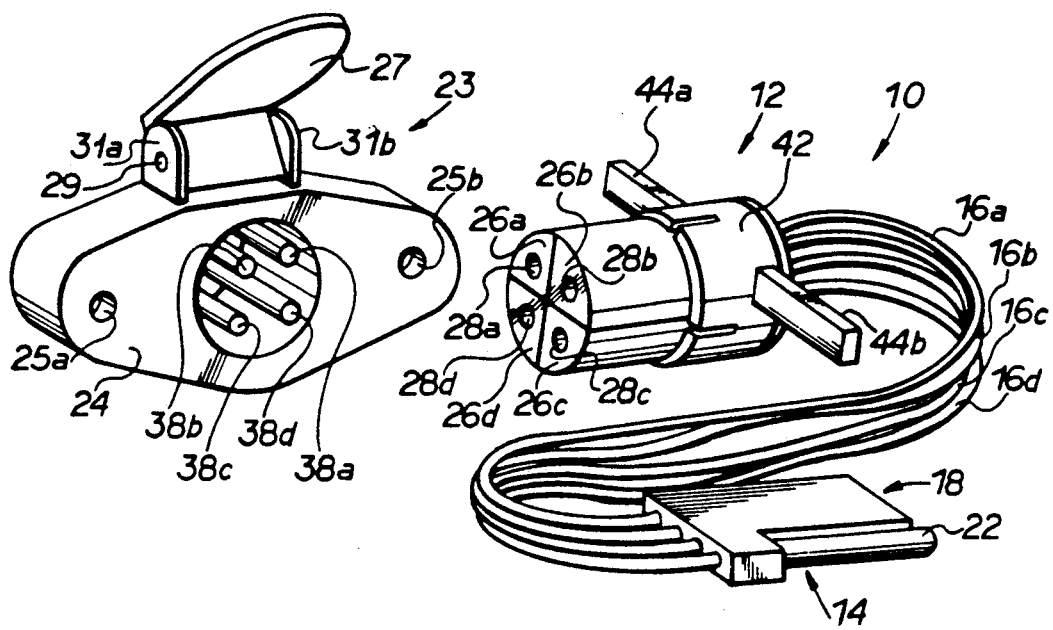
FIG. 1 is a perspective view showing a novel modifiable harness adaptor in accordance with the present invention and showing a conventional harness connector for connecting in mating correlative engagement with a modifiable adaptor connector of the novel adaptor.
Figure 2:
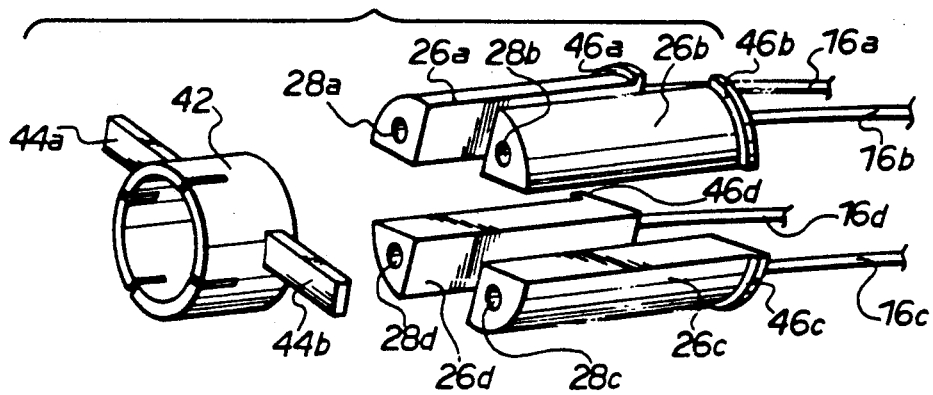
FIG. 2 is an exploded, perspective, assembly view of the modifiable adaptor connector of the modifiable harness adaptor of FIG. 1.

Referring now to the drawings in which like numerals designate corresponding parts throughout the several views, FIGS. 1 and 2 illustrate a modifiable harness adaptor 10 for interfacing a first harness connector of a first vehicle to an incompatible second harness connector of a second vehicle. The first vehicle may tow the second vehicle, or vice versa. As an example for purposes of illustration and discussion, the modifiable harness adaptor 10 is shown in FIG. 1 as having a modifiable four-way-round adaptor connector 12 at one end and having a conventional four-way-flat adaptor connector 14 at the other end. The four-way-round adaptor connector 12 and the four-way-flat adaptor connector 14, both having preferably plastic insulative parts, are interfaced to each other via a plurality of insulated interconnect wires 16a-16d. In the usual arrangement, each of the interconnect wires 16a-16d is dedicated the following respective vehicle electrical functions: (1) right blinker signal and brake signal, (2) left blinker signal and brake signal, (3) park signal (tail markers), and (4) ground. However, as should be obvious to one of skill in the art, the present invention is not limited to the foregoing functions or function ordering.

The four-way-flat adaptor connector 14 has a substantially linear arrangement of three female pin terminals (not shown) situated in the location indicated by reference numeral 18 and connected respectively to interconnect wires 16a-16c. Further, a male pin terminal 22, disposed in linear alignment with the three female pin terminals, is connected to interconnect wire 16d. The four-way-flat adaptor connector 14 is configured to attach in mating engagement with a conventional correlative four-way-flat harness connector having corresponding three male pin terminals and a corresponding female pin terminal.

The modifiable four-way-round adaptor connector 12 is adjustable and can be adapted to connect to any conventional four-way-round harness connector 23 in mating correlative engagement. The conventional four-way-round harness connector 23 is shown in FIG. 1 as a receptacle-style harness connector having mounting face plate 24, mounting screw holes 25a, 25b, and hinged cover 27. As illustrated in FIG. 2, to effectuate easy modification, the modifiable four-way-round adaptor connector 12 has four sectorial terminal sections 26a-26d, each having a corresponding female pin terminal 28a-28d connected in any order with the interconnect wires 16a-16d. The female pin terminals 28a-28d are configured, or arranged, to accept the male pin terminals 38a-38d on any conventional four-way-round harness connector 23.

As further shown in FIG. 2, the four sectorial terminal sections 26a-26d are held together in a cylindrical configuration with an outer, removable, ring-like retainer 42, which is slidably engaged over the longitudinal portion of each of the sectorial terminal sections 26a-26d in a resultant binding arrangement. The removable ring-like retainer 42 has two outwardly protruding and respectively opposing bar handles 44a, 44b for the purpose of enabling easy handling and directing of the ring-like retainer 42 and novel adaptor connector 12. Further, the four sectorial terminal sections 26a-26d each comprise an outwardly protruding lip portion 46a-46d which, when combined by the ring-like retainer 42, derive a continuous flange 46 protruding concentrically about the sectorial terminal sections 26a-26d. The foregoing continuous flange 46 serves as a stop for the ring-like retainer 42 when the ring-like retainer 42 is situated and slidably engaged about the sectorial terminal sections 26a-26d.

In order to use the modifiable harness adaptor 10 in accordance with the principles of the present invention, the ring-like retainer 42 is removed from about the four sectorial terminal sections 26a-26d. Hence, the sectorial terminal sections 46a-46d are freely maneuverable, as illustrated in FIG. 2, and can be configured so that the female pin terminals 28a-28d reside in any desired spatial orientation. If it is not known what particular electrical function each of the male pin terminals 38a-38d of the harness connector 23 is dedicated to, then the particular electrical function for each can be determined by taking a sectorial terminal section 46a-46d and connecting it to the female pin terminals 38a-38d in succession until the electrical function of each is identified by trial and error. Once the particular electrical function is identified for each of the male pin terminals 38a-38d, all of the sectorial terminal sections 46a-46d are oriented accordingly, and the ring-like retainer 42 is slid over the longitudinal sectorial terminal sections 46a–46d in binding engagement so as to hold and maintain the sections 46a–46d together.

It will be obvious to those skilled in the art that many variations and modifications may be made to the above-described embodiments without substantially departing from the spirit and scope of the present invention. As examples, the modifiable adaptor connector 12 could be constructed with a rectangular-, square-, or other geometrical-shaped cross section, or with a plurality of rectangular, square, or other geometrical-shaped terminal sections 26a–26d, or with a rectangular, square, or other geometrical-shaped retainer 42. As further examples, each of the terminal sections 26a–26d could have more than one terminal, or could be constructed with male pin terminals, female blade terminals, male blade terminals, or combinations thereof. Accordingly, all such variations and modifications are intended to be included herein within the scope of the present invention and within the scope of the following claims.

Wherefore, the inventor claims the following:

1. A modifiable harness adaptor for interfacing a first harness connector of a first vehicle to an incompatible second harness connector of a second vehicle, the adaptor comprising:
   a first adaptor connector for connecting to said first connector;
   a second adaptor connector for connecting to said second harness connector, said second adaptor connector having terminal sections, each of said terminal sections having a second adaptor terminal, said terminal sections being separable from one another to thereby selectively orient said second adaptor terminals; and
   a plurality of movable interconnect wires connecting first adaptor terminals of said first adaptor connector with said second adaptor terminals of said second adaptor connector.

2. The vehicle harness adaptor of claim 1, wherein said second adaptor connector comprises a plurality of said terminal sections, each of said terminal sections having a corresponding terminal, said terminal sections being held together via a removable retainer.

3. The vehicle harness adapter of claim 1, wherein said second adapter connector comprises female terminals and is substantially circular, each of said female terminals having a corresponding said terminal section, said terminal sections being held together via a removable ring-like retainer surrounding and holding said terminal sections together.

4. The vehicle harness adapter of claim 1, wherein said first adapter terminals comprise a substantially linear arrangement of three female pin terminals and a male pin terminal and wherein said second adapter terminals comprise female terminals arranged in a substantially circular configuration.

5. The vehicle harness adapter of claim 1, wherein said first vehicle tows said second vehicle, or vice versa.

6. A vehicle harness adaptor, comprising:
   a first adaptor harness connector; and
   a modifiable harness connector connected to said first adaptor harness connector via interconnect wires connecting respective terminals of said first adaptor harness connector and said modifiable harness connector, said modifiable harness connector having a plurality of terminal sections, each of said terminal sections having a respective said terminal, said terminal sections being held together via a removable retainer and being movable relative to one another upon removal of said retainer.

7. The vehicle harness adapter of claim 6, wherein said modifiable harness connector comprises female terminals and is substantially circular, each of said female terminals having a corresponding said terminal section, said terminal sections being held together via a removable retainer ring surrounding said terminal sections.

8. The vehicle harness adaptor of claim 6, wherein said first adapter harness connector comprises a substantially linear arrangement of three female pin terminals and a male pin terminal and wherein said modifiable harness connector comprises female terminals arranged in a substantially circular configuration.

9. A method for interfacing a first harness connector of a first vehicle to an incompatible second harness connector of a second vehicle, the method comprising the steps of:
   forming a first adaptor connector having a plurality of terminals for connecting to said first harness connector; and
   forming a second adaptor connector having a plurality of terminal sections, each of said terminal sections having a terminal, said terminal sections being held together via a removable retainer and being movable relative to one another upon removal of said retainer; and
   connecting interconnect wires between said terminals of said first and second adaptor connectors.

* * * * *